United States Patent [19]

McLean

[11] 3,742,379

[45] June 26, 1973

[54] VOLTAGE TO FREQUENCY CONVERTER

[75] Inventor: Michael B. McLean, Franksville, Wis.

[73] Assignee: Johnson Service Company, Milwaukee, Wis.

[22] Filed: Nov. 12, 1970

[21] Appl. No.: 88,850

[52] U.S. Cl. ................. 331/111, 307/228, 328/127, 331/143

[51] Int. Cl. ............................................ H03k 4/56

[58] Field of Search ........................... 331/111, 143; 307/228; 328/128, 129, 127

[56] References Cited

UNITED STATES PATENTS

| | | | |
|---|---|---|---|
| 3,045,148 | 7/1962 | McNulty et al. | 331/111 |
| 3,302,128 | 1/1967 | Schoemehl et al. | 307/305 |
| 3,313,924 | 4/1967 | Schulz et al. | 328/128 |
| 3,434,060 | 3/1969 | Painter et al. | 328/127 |
| 3,479,496 | 11/1969 | Buesch et al. | 328/127 |
| 3,482,116 | 12/1969 | James | 307/228 |
| 3,521,082 | 7/1970 | Wolk | 307/228 |
| 3,539,825 | 11/1970 | Hardaway | 307/228 |
| 3,550,018 | 12/1970 | James et al. | 328/127 |
| 3,564,428 | 2/1971 | Demark | 328/127 |
| 3,156,875 | 11/1964 | Fiorino et al. | 331/111 |
| 3,215,950 | 11/1965 | Reiner | 331/111 |
| 3,470,495 | 9/1969 | Deboo | 331/111 |
| 3,486,133 | 12/1969 | James | 331/143 |
| 3,559,098 | 1/1971 | Chandos | 331/111 |

OTHER PUBLICATIONS

Electronic Design, Pg. 122, Dec. 6, 1967.

E. Breeze, Pg. 90, Electronics, Aug. 17, 1970.

T. I. Cakulev, Electronic Engineering, Mar. 1969, Pg. 346–349.

*Primary Examiner*—John Kominski

*Attorney*—Andrus, Sceales, Starke & Sawall

[57] ABSTRACT

An operational amplifier having a feedback circuit produces a periodic signal having a frequency linearly proportional to the magnitude of an analog input voltage. The feedback circuit includes three parallel paths, one of which includes a resistor in series with a zener diode, the second of which includes a controlled rectifier having a gate connected to the junction of the resistor and diode and the third of which includes a capacitor. The capacitor charges to the Zener breakdown voltage which then conducts and biases the controlled rectifier into conduction to discharge the capacitor. An output circuit is connected to the capacitor to receive the discharge pulses, which are converted into a square wave signal by a Schmitt trigger circuit. The analog input voltage is amplifier by a differential amplifying section.

5 Claims, 4 Drawing Figures

INVENTOR.
MICHAEL B. McLEAN
BY
Andrus, Sceales, Starke & Sawall
Attorneys

VOLTAGE TO FREQUENCY CONVERTER

BACKGROUND OF THE INVENTION

This invention relates to a voltage to frequency converter and particularly to an operational amplifier having a controlled feedback circuit producing a periodic output signal having a frequency linearly proportional to the magnitude of an analog input signal.

Oscillator circuits have been employed to produce a variable frequency output. Generally, the impedance is an operational amplifier feedback network controlled to adjust the gain of the operational amplifier circuitry and thereby vary the frequency of oscillation. Such circuits have generally required complex circuits in order to convert analog input voltages linearly into proportional output frequencies.

An oscillator with a pulse generating circuit has also been suggested wherein charging and discharging of a capacitor produces a pulsed output. For example, U.S. Pat. No. 3,302,128 employs a capacitor connected across a battery and in parallel with a second capacitor that is charged by the voltage source through a resistor. A paralleled load is connected in series with a controlled rectifier which has its gates connected to the second capacitor by a Zener diode. The controlled rectifier fires to discharge the first capacitor when the second is charged to the Zener voltage. Applicant realized that such circuits will not produce a linear relationship between the charging voltage and the output pulse frequency because the source is a constant voltage. In addition, the characteristic of the Zener diode which is in series with the controlled rectifier gate is temperature sensitive and will create frequency variances with temperature. Such circuits have not provided a linear voltage to frequency conversion.

SUMMARY OF THE INVENTION

This invention relates to a voltage to frequency converter which establishes a periodic output signal having a frequency linearly proportional to the magnitude of an analog input signal.

In accordance with the present invention, an operational amplifier having a particular feedback circuit is connected to receive an analog voltage signal and generate a pulse train signal having a frequency which is linearly proportional to the analog voltage signal. The operational amplifier is constructed to supply an essentially constant current output signal to the feedback circuit with the current proportional to the analog input signal. The feedback circuit includes a capacitor which is selectively charged linearly at a rate dictated by the constant current supplied by the operational amplifier and rapidly discharged at a selected output discharge circuit.

The discharge circuit is connected across the capacitor and responsive to the charge thereon. Specifically, a low impedance load and a trigger means such as a controlled rectifier is parallel connected to the capacitor and is selectively biased into conduction by a capacitor voltage sensing circuit such as a serially connected resistor and Zener diode which is also paralleled with the capacitor. The gate of the controlled rectifier is connected to the juncture between the resistor and the Zener diode. When the capacitor has charged to the Zener voltage, the Zener diode conducts and a voltage drop is developed across the resistor which biases the controlled rectifier into conduction.

In operation, the capacitor is therefore linearly charged by the constant current from the operational amplifier until the Zener voltage is reached which establishes conduction through the voltage sensing circuit. The controlled rectifier then conducts to provide a rapid discharge of the capacitor.

The cyclic rate or frequency of capacitive discharge depends upon the charging rate of the capacitor which is dictated by the rate of current flow provided by the operational amplifier. This charging current is related to the analog voltage level and is constant for any analog voltage. A pulse train signal having a frequency which is linearly proportional to the analog input voltage is therefore established. An inductor may be serially connected with the capacitor in the feedback circuit to extend the range of oscillations.

The output of the circuit has been advantageously employed to generate a controlled frequency square wave. In this operation, a square wave generator circuit such as a bistable multivibrator in the divide by two mode is connected to produce a square wave signal having a frequency which is one-half of the periodic rate of pulse discharges. Such a square wave signal has been found to be highly effective for use in information transmissions to remote monitoring stations.

An input circuit to the operational amplifier may advantageously include a voltage dividing resistor circuit to effectively scale the voltage level to the operating range of the operational amplifier. To provide a setpoint control, a differential amplifier may compare the analog input voltage to a setpoint voltage and provide a related output analog voltage to the voltage dividing network.

A simple and highly efficient linear voltage to frequency converter is provided as a result of the operational amplifier feedback circuit to produce a periodic output signal having a frequency linearly proportional to the magnitude of an analog voltage signal.

BRIEF DESCRIPTION OF THE DRAWING

The drawing furnished herewith illustrates the best mode presently contemplated by the inventor and clearly discloses the above advantages and features, as well as others which will be readily understood from the detailed description thereof.

In the drawing.

DESCRIPTION OF THE PREFERRED ILLUSTRATED EMBODIMENT

Figure 1:
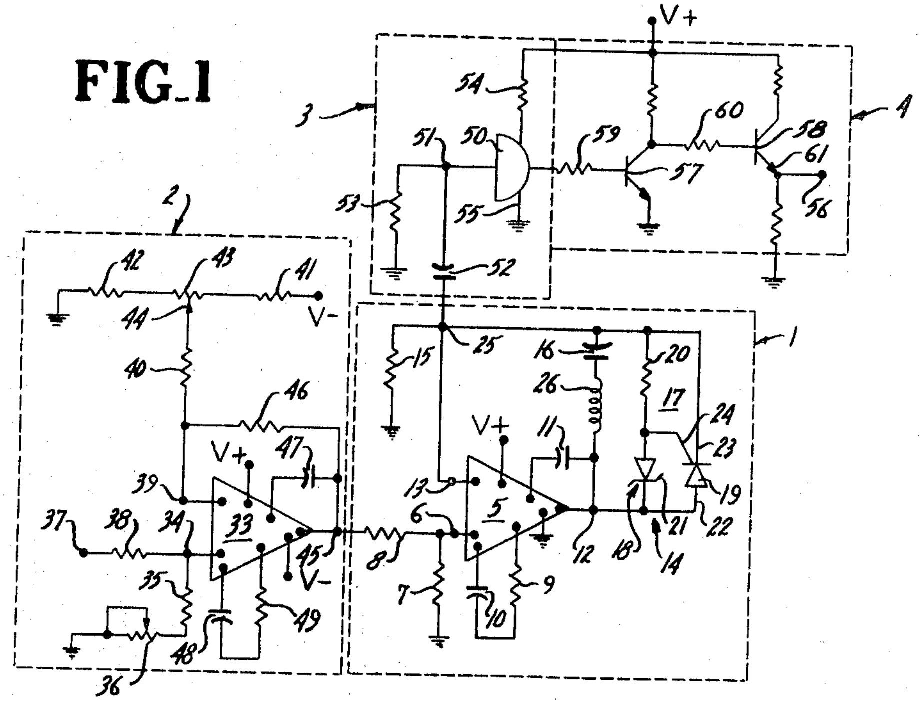
FIG. 1 is a schematic circuit of a voltage to frequency converter constructed in accordance with the present invention.

Referring to the drawing and particularly to FIG. 1, the illustrated embodiment of the invention includes a voltage to frequency converter 1 connected to receive an analog input voltage from a differential amplifying section 2. The output of converter 1 is connected to supply triggering pulses to an output means shown as a square wave generator circuit 3 which produces a cyclic square wave output through cascaded amplifiers 4. The square wave output has a frequency which is linearly proportional to the magnitude or level of the analog input voltage applied to differential section 2.

The voltage to frequency converter 1, which particularly forms the subject matter of the present invention, includes an operational amplifier 5 which consists of a high gain, general purpose operational amplifier well known to those skilled in the art. Amplifier 5 is of the type suitable for integration and generally includes a low offset, a high input impedance, a large input common mode range, a low power consumption, and a large output swing under load.

The operational amplifier 5 is shown with an inverting input 6 connected to ground through a resistor 7 and connected to amplifying section 2 through a resistor 8. Resistors 7 and 8 form a voltage divider and are selected to scale the input voltage to the operating design level of the operational amplifier 5.

Known compensation networks are shown added to operational amplifier 5 to provide stability of operation. Specifically, a resistor 9 and a capacitor 10 are serially connected to provide a feedback about a second stage, not shown, of the amplifier 5, and a capacitor 11 is connected in a feedback path about the output stage. The operational amplifier 5 is further grounded and connected to a positive voltage bias designated schematically as "V+." In operation, operational amplifier 5 provides a constant current output for a given analog voltage input.

In accordance with the present invention, the operational amplifier 5 contains an output 12 connected to a non-inverting input 13 through a triggered feedback circuit 14. The non-inverting input 13 of operational amplifier 5 is further connected to ground through a resistor 15. A capacitor 16 in the triggered feedback circuit 14 is connected between the output 12 and input 13 and is charged by the constant current provided by operational amplifier 5. The capacitor 16 in the feedback loop of the operational amplifier 5 provides a known integrating operation wherein the voltage relationship is defined by the equation $e = CR(dV/dT)$ with $e$ the input voltage, $C$ the capacitance of capacitor 16, $R$ the resistance of the resistor 15 and $V$ the capacitor or output voltage. The operational amplifier thus connects the capacitor 16 to a constant source, with the linear dependence of the rate of charge of capacitor 16 upon the input voltage shown by the above equation.

A triggering or discharge circuit 17 is parallel connected to capacitor 16 to selectively establish charging and discharging of capacitor 16. Triggering circuit 17 is comprised of a voltage sensing circuit or branch 18 which is parallel connected to a silicon controlled rectifier 19. The voltage sensing branch 18 includes a resistor 20 in series with a Zener diode 21 connected across capacitor 16. The controlled rectifier 19 has an anode 22 connected to output 12 and the bottom side of capacitor 16 and a cathode 23 connected to the opposite side of capacitor 16. Rectifier 19 includes a gate 24 connected to the common juncture of resistor 20 and Zener diode 21 of branch 18 to selectively fire the rectifier to conduct and discharge the capacitor 16.

In operation, operational amplifier 5 receives a voltage input signal through resistor 8 and inverting input 6 and supplies a constant current at output 12 having a magnitude directly proportional to the input voltage. The constant current linearly charges capacitor 16 until the Zener voltage of Zener diode 21 is reached. The diode then conducts. Conduction through Zener diode 21 produces a related voltage drop across resistor 20 and a corresponding voltage drop appears across the gate to the cathode circuit of controlled rectifier 19 which conducts and discharges capacitor 16 through resistor 15. The controlled rectifier 19 conducts until capacitor 16 can no longer supply the necessary holding current to rectifier 19. When controlled rectifier 19 ceases to conduct, capacitor 16 is again charged by the constant current in accordance with the level of the analog voltage input, as previously described. The rectifier 19 establishes a very small resistance when conducting and the discharge time of capacitor 16 is therefore of a relatively short duration compared to the charging time and may be practically considered to be an essentially instantaneous discharge.

The charging time and the frequency of capacitive discharge is as a result linearly dependent upon the input voltage $e$ and the previous equation becomes:

$$e = RCV_z f,$$

where $V_z$ is the Zener voltage and $f$ is the frequency.

An output line 25 is shown connected to the triggered feedback circuit 14 between capacitor 16 and non-inverting input 13 to supply the output pulses to the circuit 3.

A small inductor 26 is shown connected in series with capacitor 16 in triggered feedback circuit 14. Although not essential, Applicant has found that the inductor provides an extended oscillation range for the oscillator.

Figure 2:
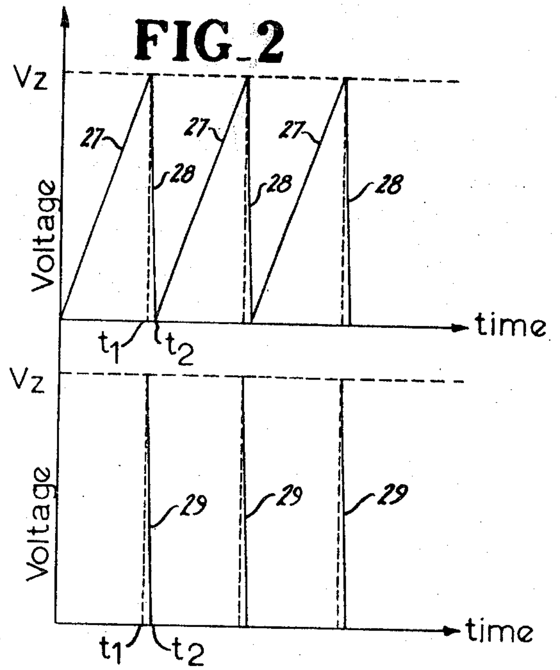
FIG. 2 is a typical graphical illustration of the voltage versus time waveforms appearing at the output node of the operational amplifier and at a node in the triggered feedback circuit and shows the charging and discharging cycles of the capacitor and the discharge pulses applied to the square wave generator.
Figure 3:
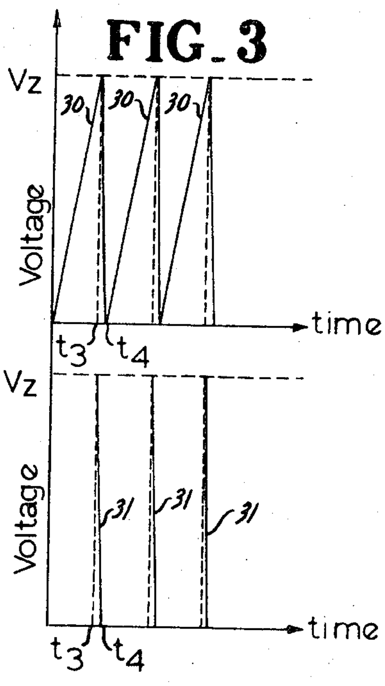
FIG. 3 is a graphical illustration similar to FIG. 2 showing the effect of an increased voltage input.

The operation of the voltage to frequency converter 1 is graphically illustrated in FIGS. 2 and 3. Specifically, the upper trace in FIG. 2 shows the voltage waveform appearing at output 12 for a given analog input voltage. Initially, capacitor 16 is charged by the constant current output of operational amplifier 5, and the voltage linearly increases as at trace 27. At time $t_1$, the capacitor 16 is charged to the Zener voltage, and controlled rectifier 19 conducts and rapidly discharges capacitor 16, as at trace 28. At time $t_2$, capacitor 16 has completely discharged to complete the cycle and charging begins again.

The lower trace in FIG. 2 graphically illustrates the voltage waveform at line 25 corresponding to the same analog input voltage as applied in the upper trace. Thus, when the rectifier 19 conducts, the line 25 is connected to the output 12 and the bottom side of capacitor 16 to apply a positive voltage pulse 29 beginning at time $t_1$ and ending at time $t_2$ in accordance with the discharge of capacitor 16 as shown in the upper trace.

As the magnitude of the analog input voltage changes, the constant current produced by operational amplifier 5 correspondingly changes. As shown in the upper trace of FIG. 3, an increased analog input voltage results in the voltage appearing at output 12 increasing at a proportionate greater rate. Capacitor 16 is therefore linearly charged at a greater rate, as shown by line 30, and becomes fully charged to the Zener voltage at time $t_3$. The discharging of capacitor 16 occurs identically as illustrated in FIG. 2 and the second charging cycle begins at time $t_4$.

Figure 4:
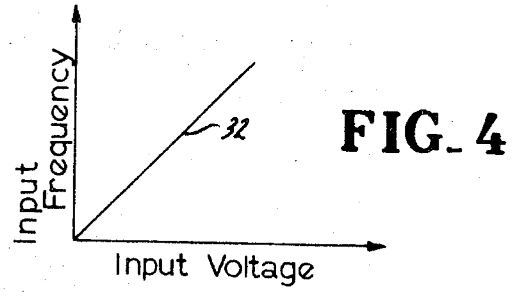
FIG. 4 is a typical graphical illustration showing the relationship between output frequency and input voltage.

Thus, the voltage output at node 25 will appear as shown in the lower trace of FIG. 3 as a series of pulses each beginning at time $_3$ and ending at time $t_4$. Since time $t_3$ is less than time $t_1$, the frequency of pulses 31 will be greater than the frequency of pulses 29 due to the increased analog input voltage. The pulsed output provided has a frequency which is linearly proportional to the analog input voltage. The linearity is graphically illustrated by line 32 in FIG. 4.

In the illustrated embodiment, the differential amplifying section 2 establishes the analog signal. Section 2 includes an operational amplifier 33 which may be similar to operational amplifier 5. An inverting input terminal 34 of amplifier 33 is connected to ground through serially connected resistor 35 and variable resistor 36. The inverting input 34 is further connected to an input terminal 37 through a resistor 38. A non-inverting input terminal 39 of amplifier 33 is connected to receive a comparing voltage through an input resistor 40. A voltage source designated as V− is connected to ground through a pair of resistors 41 and 42 and a variable resistor 43 having a tap 44 which is connected to input resistor 40. Tap 44 is positioned to establish an appropriate input operating voltage level for amplifier 33 in accordance with the level of the incoming analog voltages appearing at terminal 37.

An output terminal 45 of operational amplifier 33 is connected to the input resistor 8 of the amplifier 5 and to input terminal 39 of amplifier 33 through a feedback resistor 46 to provide a negative feedback. The operational amplifier 33 may include a pair of compensating feedback capacitors 47 and 48 and a resistor 49 similar to amplifier 5.

The differential amplifying section 2 is connected to receive an analog voltage signal at terminal 37 while tap 44 is adjusted to provide the proper output voltage range for operational amplifier 5 of the converter 1.

In the illustrated embodiment of the invention, the output of the converter 1 is connected to form a square wave signal. The circuit 3 may, for example, be an integrated divide by two flip-flop and is shown diagrammatically as a labeled block 50 connected to a suitable bias supply and with an input terminal 51 connected to line 25 of voltage to frequency converter 1 through a coupling capacitor 52. The input terminal 51 is further connected to ground through a resistor 53. In operation, the circuit 3 receives the train of periodic pulses produced by the discharging capacitor 16, as schematically shown in FIGS. 2 and 3. Circuit 3 produces a square wave output signal voltage having one-half the frequency of the incoming pulses.

The square wave voltage is further amplified by the cascaded amplifiers 4 to supply a square wave output signal at a terminal 56. The illustrated cascaded amplifiers 4 include a pair of NPN transistors 57 and 58 connected in common emitter configuration and with transistor 57 connected to circuit 50 through an input resistor 59. A resistor 60 connects the input of transistors 58 to the collector of transistor 57. Transistor 58 is connected in an emitter follower configuration with output terminal 56 connected to the emitter 61 of transistor 58.

The present invention, as shown in the embodiment of FIG. 1, has provided a highly satisfactory linear conversion of an input analog voltage ranging between 1.7 and 2.6 volts direct current to a square wave signal having a frequency ranging between 2,000 and 3,000 hertz.

The present invention thus provides a highly satisfactory and reliable voltage to frequency conversion in which an analog input voltage is converted into a periodic signal having a frequency linearly proportional to the magnitude of the voltage input.

Various modes of carrying out the invention are contemplated as being within the scope of the following claims which particularly point out and distinctly claim the subject matter which is regarded as the invention.

I claim:

1. A circuit to produce a periodic signal having a frequency linearly proportional to the magnitude of an analog input signal, comprising a capacitor, a constant current source including an amplifying means having an input means to receive said analog signal and defining a source of constant current, said capacitor being connected in a feedback loop between the output and input means of said amplifying means to charge said capacitor in accordance with the magnitude of the input signal, an inductor connected in series with said capacitor in said feedback loop, a unidirectional gated switch means having a holding current of essentially zero and having an essentially zero impedance when turned on, said gated switch means being connected in parallel with the capacitor and the inductive means, a voltage sensing branch including a voltage breakdown element in series with a current limit means connected directly in parallel with said capacitor and said inductor and in parallel with said gated switch means and defining a precise trigger voltage signal at a selected capacitor voltage, the junction of said voltage breakdown element and the current limit means being connected to impress the voltage signal on said gated switch means.

2. The circuit of claim 1, wherein said gated switch means is a controlled rectifier means.

3. The circuit of claim 2, wherein said voltage breakdown element is a serially Zener diode and said current limit means is a resistor, said Zener diode conducting when said capacitor charges to said selected voltage level to initiate conduction in said gated switch means.

4. The circuit of claim 1 including a differential amplifier means having a set point signal means input and an analog signal means input and having an output means connected to said amplifying means.

5. The circuit of claim 1 having a square wave generator circuit connected to said feedback circuit between the capacitor and the input means to receive said periodic signal and producing a square wave signal having a frequency one-half of the frequency of said periodic signal and proportional to the magnitude of said analog signal.

* * * * *

UNITED STATES PATENT OFFICE
CERTIFICATE OF CORRECTION

Patent No. 3,742,379 Dated June 26, 1973

Inventor(s) MICHAEL B. McLEAN

It is certified that error appears in the above-identified patent and that said Letters Patent are hereby corrected as shown below:

Column 6, Claim 1, Line 35, cancel "inductive means" and insert --- inductor ---;

Column 6, Claim 5, Line 57, after "feedback" cancel "circuit" and insert --- loop ---.

Signed and sealed this 10th day of December 1974.

(SEAL)
Attest:

McCOY M. GIBSON JR.
Attesting Officer

C. MARSHALL DANN
Commissioner of Patents

ORM PO-1050 (10-69)

USCOMM-DC 60376-P69
★ U.S. GOVERNMENT PRINTING OFFICE : 1969 O—366-334.